United States Patent
Lin et al.

(10) Patent No.: US 7,787,537 B2
(45) Date of Patent: Aug. 31, 2010

(54) METHOD AND APPARATUS FOR LOW-MEMORY HIGH-PERFORMANCE DISCRETE COSINE TRANSFORM COEFFICIENT PREDICTION

(75) Inventors: Chien-Yu Lin, Sanchong (TW); Tzu-Hsin Wang, Hsinchu (TW); Pai-Chu Hsieh, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1289 days.

(21) Appl. No.: 11/314,788

(22) Filed: Dec. 19, 2005

(65) Prior Publication Data
US 2007/0014350 A1 Jan. 18, 2007

(30) Foreign Application Priority Data
Jul. 13, 2005 (TW) .............................. 94123690 A (51) Int. Cl.
*H04B 1/66* (2006.01)
*G06F 7/00* (2006.01)

(52) U.S. Cl. ...................................... 375/240; 712/300

(58) Field of Classification Search ................. 375/240, 375/240.1, 240.03, 240.12, 259, 240.26, 375/240.15, 240.25, 354, 344, 240.23; 382/303, 382/232, 246, 162; 358/1.15, 1.16, 2.99, 358/1.9; 348/441; 712/300, 200, 222, 220, 712/225, 223
See application file for complete search history.

(56) References Cited

U.S. PATENT DOCUMENTS
6,768,774 B1 * 7/2004 MacInnis et al. ....... 375/240.15

\* cited by examiner

*Primary Examiner*—Saeid Ebrahimi-dehKordy
(74) *Attorney, Agent, or Firm*—J.C. Patents (57) ABSTRACT

A method and an apparatus for discrete cosine transform coefficient prediction are disclosed. The method comprises the steps as follows: providing a discrete cosine transformed block; performing an AC prediction mode variable length coding and a non-AC prediction mode variable length coding simultaneously; providing a first memory block and a second memory block for storing the bit strings of two coding; and using another coding as long as one of first and second memory blocks reaches its capacity limit.

2 Claims, 7 Drawing Sheets

METHOD AND APPARATUS FOR LOW-MEMORY HIGH-PERFORMANCE DISCRETE COSINE TRANSFORM COEFFICIENT PREDICTION

CROSS-REFERENCE TO RELATED APPLICATION

This application claims the priority benefit of Taiwan application serial no. 94123690, filed on Jul. 13, 2005. All disclosure of the Taiwan application is incorporated herein by reference.

BACKGROUND OF THE INVENTION

1. Field of the Invention

The present invention relates to a method and an apparatus for video coding, and more particularly, to a method and an apparatus for discrete cosine transform coefficient prediction.

2. Description of the Related Art

A digital video clip can be regarded as a series of still digital images, which may be seen as continuous video images due to the temporary vision effect in human eyes when the digital video clip is continuously played. However, if the digital video is not compressed yet, great storage space and high transmission bandwidth are required. Take a 15 frames/sec of 90-minutes full color digital video with a size of 640×480 for example, the bandwidth is:

640*480(pixels/frame)*3(bytes/pixel)*15(frames/sec)
=13824000 bytes/sec=13.18 MB/sec and the space for storage is: 13.18*90*60=69.50 GB.

Obviously, it is not good enough, thus various technology for digital video compression are developed.

A method had been proposed in the prior art, where a discrete cosine transform (DCT) is utilized to transfer a frame from a spatial domain to a frequency domain, such that the high frequency signal therein is eliminated and the data is compressed.

Figure 1A:
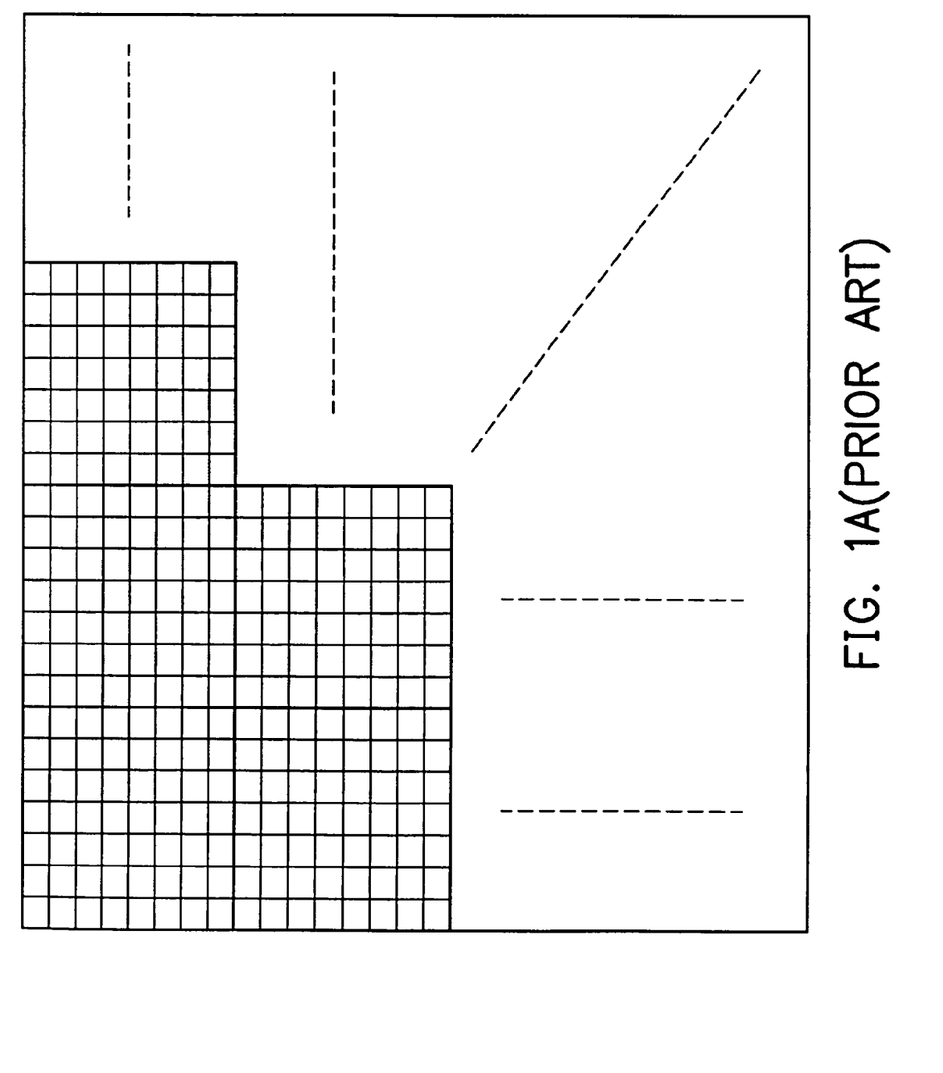
FIG. 1A schematically shows a case of dividing each frame into a plurality of macro-blocks when processing the video in the prior art.
Figure 1B:
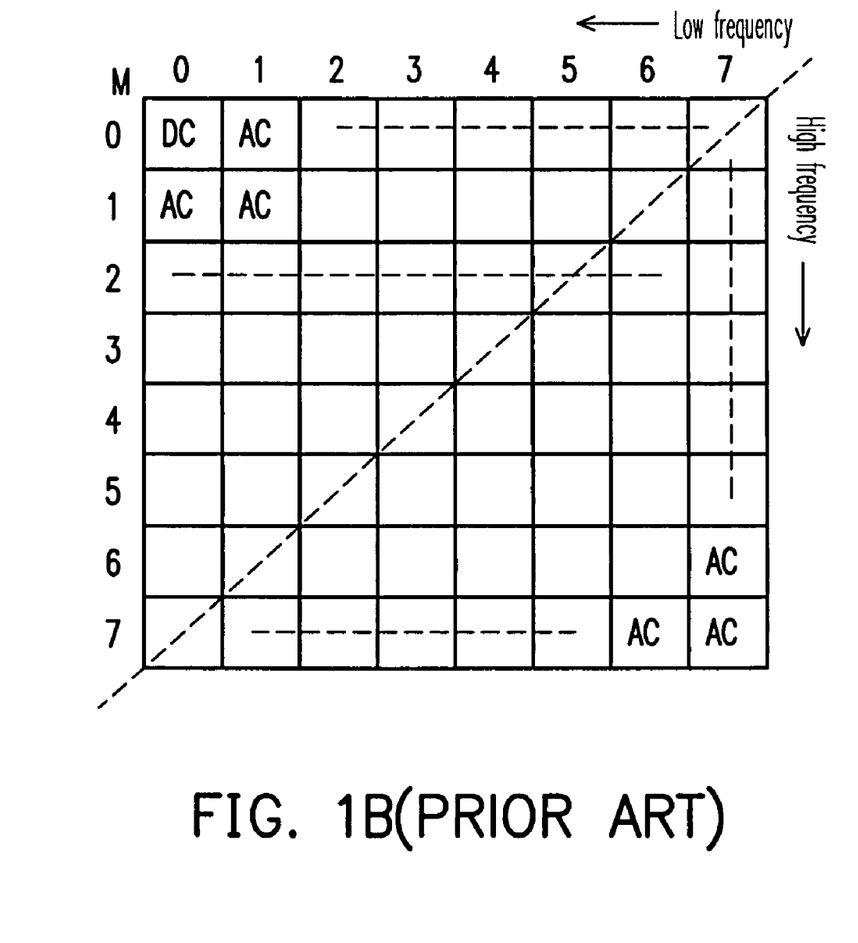
FIG. 1B schematically shows a case of performing the discrete cosine transform process on the block in the prior art.
Figure 1C:
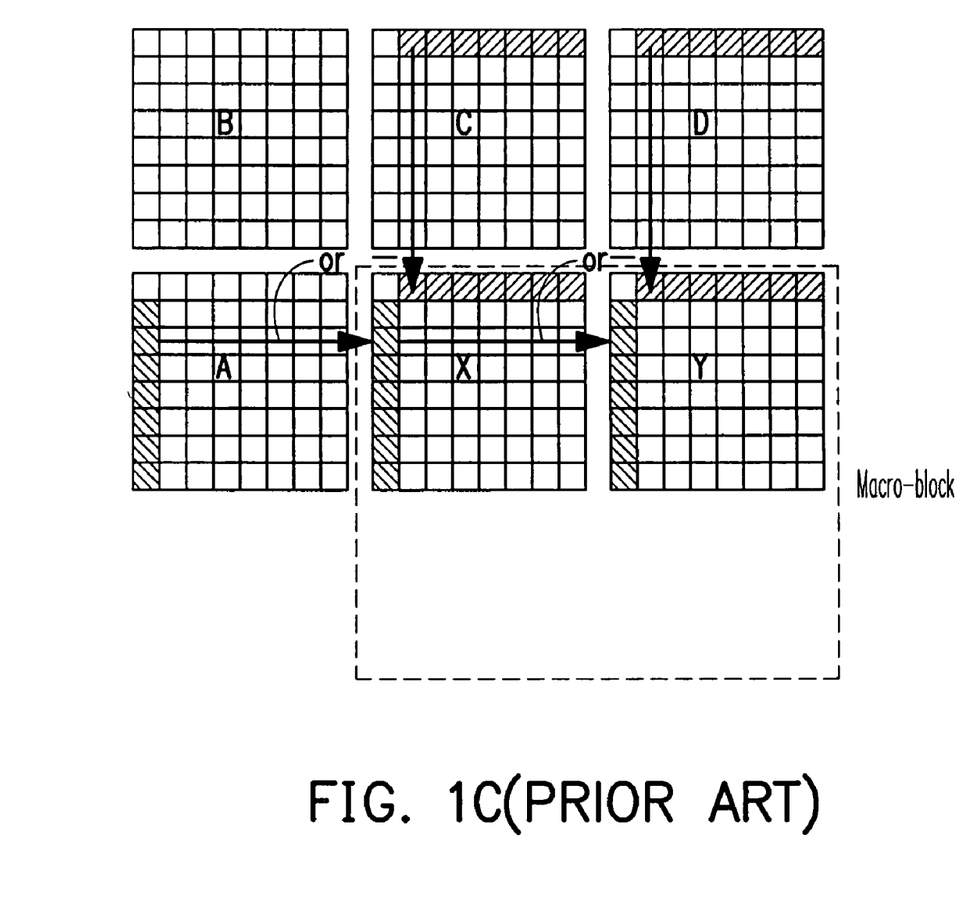
FIG. 1C schematically shows a structure of the blocks inside the macro-block.

It is common in processing the video that each of the frames is divided into a plurality of 16×16 macro-blocks as shown in FIG. 1A. Wherein, each macro-block comprises a plurality of blocks as shown in FIG. 1C, which is derived from the MPEG4 ISO/IEC 14469-2 specification. In accordance with the MPEG4 specification, a 16×16 macro-block is divided into four (8×8) blocks. Then, the discrete cosine transform process is sequentially performed on each of the (8×8) blocks in the macro-block as shown in FIG. 1B. The spatial energy after the transformation is concentrated on the values of a few low-frequency (on the top-left corner), and the coefficients of high-frequency almost approaches zero (on the bottom-right corner). Then, the coefficient of high-frequency is reduced to zero as much as possible by means of quantization. In FIG. 1B, M(0, 0) is referred as a DC item, and all the other 63 items are referred as AC items. Wherein, the DC item represents an average luminance of the entire block, and other AC items represent the tiny variance of the block.

Figure 2:
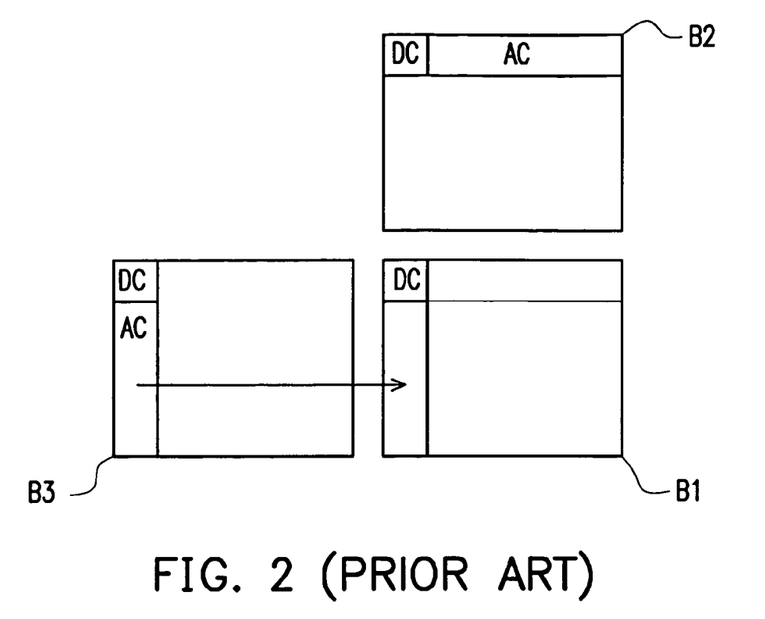
FIG. 2 schematically shows a conventional AC predication.

Since the colors of the neighboring points are very close, a method called AC prediction had been proposed in the prior art as shown in FIG. 2, in which the AC item of the neighboring block is directly being substituted for the AC item of the block if the DC item of the block is close to the DC item of the neighboring block. The DC item of the block B1 is compared with the DC item of the neighboring block B2 and the DC item of the block B3. If the DC item of the neighboring block B3 is similar to the DC item of the block B1 than that of the neighboring block B2, the whole column of the AC values of block B3 are used as the prediction values, which are then directly being substituted to the block B1. However, if the AC prediction mode is applied on an image that has too many variances and lacks the spatial correlation, the compression efficiency is lowered.

Figure 3:
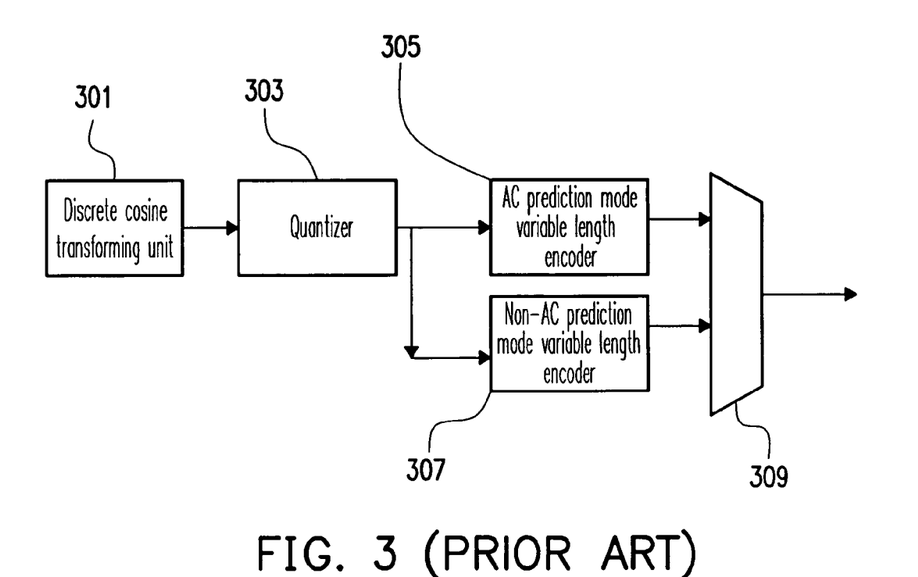
FIG. 3 schematically shows an AC predication applied in a conventional video compression process.

FIG. 3 schematically shows a physical application of a conventional video compression technology. Referring to FIG. 3, first, a discrete cosine transform process 301 is performed on the block, and then a quantization process 303 is performed on the transformed block. Then, an AC prediction mode variable length coding (VLC) 305 and a non-AC prediction mode variable length coding (VLC) 307 are simultaneously applied on the block, and all results are stored in the memory. Finally, a coding mode with fewer number of bits is selected in the selector 309, such that the video compression is effectively accomplished. However, a great amount of memory is required in such method and the mode is not determined until the block is fully coded.

SUMMARY OF THE INVENTION

Therefore, it is an object of the present invention to provide a method for discrete cosine transform coefficient prediction where a smaller memory is used for coding.

It is another object of the present invention to provide an apparatus for discrete cosine transform coefficient prediction with a smaller memory.

It is yet another object of the present invention to provide a method for discrete cosine transform coefficient prediction to achieve highly efficient coding.

The present invention provides a method for low-memory high-performance discrete cosine transform coefficient prediction. The method comprises the following steps: providing a discrete cosine transformed block; performing an AC prediction mode variable length coding and a non-AC prediction mode variable length coding simultaneously on the block; providing a memory for storing the two types of bit strings of coding result; and comparing both of the bit numbers of coding result for determining which coding result should be used before the coding process is fully completed.

In the method for discrete cosine transform coefficient prediction according to an embodiment of the present invention, the step of comparing both of the bit numbers of coding result for determining which coding result should be used before the coding process is fully completed comprises the following steps: comparing both of the bit numbers generated by coding mode in real time for selecting a coding result with fewer number of bits; using the coding result with fewer number of bits as long as the number of bits generated by one of the modes reaches the capacity limit of the memory; and using the non-AC prediction mode variable length coding when the memory reaches its capacity limit and the bit numbers generated by both coding modes are the same.

The present invention further provides an apparatus for discrete cosine transform coefficient prediction. The apparatus receives a discrete cosine transformed block and encodes the block into an encoded bit string. The apparatus comprises a first memory block, a second memory block, an AC prediction mode variable length encoder, a non-AC prediction mode variable length encoder, and a coding arbitrator. Wherein, the coding arbitrator further comprises a mode selector and an output selector. The AC prediction mode variable length encoder receives a block, performs an AC prediction process and a variable length coding on the block, and stores a first encoded bit string to the first memory block. The non-AC prediction mode variable length encoder receives a block, performs a variable length coding directly on the block, and stores a second encoded bit string to the second memory block. The mode selector compares both of the bit numbers generated by coding mode. If the first bit string has fewer number of bits than the second bit string, a first signal is generated. Whereas, if the second bit string has fewer number of bits than the first bit string, a second signal is generated. Moreover, if the bit number of the first bit string reaches a capacity limit of the first memory block, the second signal is generated. Whereas, if the bit number of the second bit string reaches a capacity limit of the second memory block, the first signal is generated. In addition, if both memory blocks reach the capacity limit, the second signal is generated. Furthermore, the output selector outputs the first bit string as the encoded bit string if the first signal is received. On the contrary, the output selector outputs the second bit string as the encoded bit string if the second signal is received.

The present invention provides a method for discrete cosine transform coefficient prediction. The method comprises the following steps: providing a discrete cosine transformed block; performing an AC prediction mode variable length coding and a non-AC prediction mode variable length coding simultaneously on the block; providing a first memory block and a second memory block for storing two types of the bit strings of coding result; and using another coding mode as long as one of the memory blocks reaches its capacity limit.

The method for discrete cosine transform coefficient prediction according to the embodiment of the present invention further comprises: comparing both of the bit numbers generated by coding mode and using the coding mode with fewer number of bits if both of the memory blocks do not reach their capacity limit; and using the non-AC prediction mode variable length coding when the memory reaches its capacity limit and the bit numbers generated by both coding are the same.

In the present invention, both of the bit numbers generated by coding mode are compared in real time, thus it is possible to determine which coding mode should be used before the coding process is fully completed. Accordingly, the present invention can speed up the process of determining the coding mode and save the memory space.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 4:
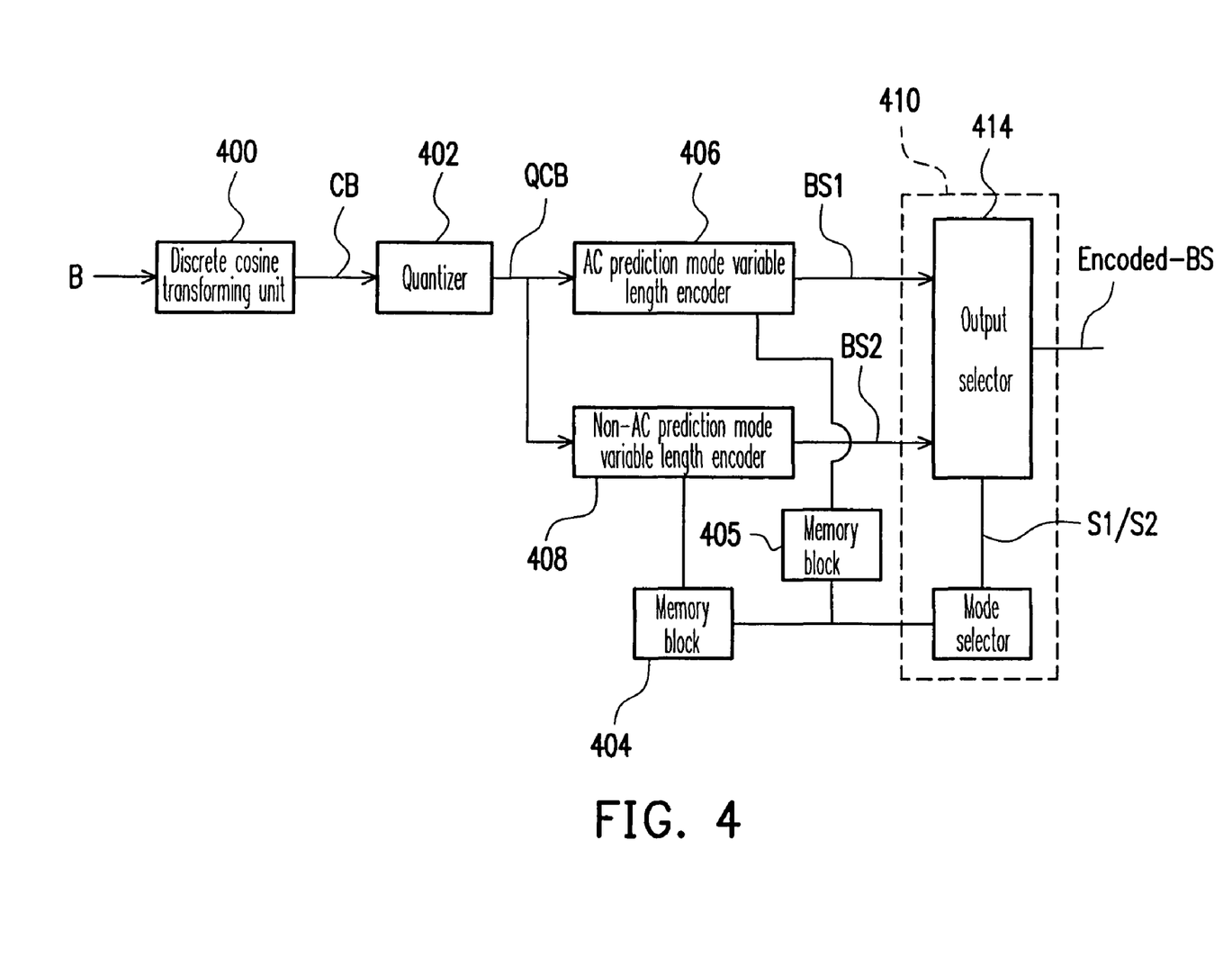
FIG. 4 schematically shows an apparatus for discrete cosine transform coefficient prediction according to an embodiment of the present invention.

The present invention provides a method and an apparatus for discrete cosine transform coefficient prediction. FIG. 4 schematically shows an apparatus for discrete cosine transform coefficient prediction according to an embodiment of the present invention. The apparatus comprises a discrete cosine transforming unit 400, a quantizer 402, and a discrete cosine coefficient prediction apparatus 40. Wherein, the discrete cosine coefficient prediction apparatus 40 comprises a memory block 404, a memory block 405, an AC prediction mode variable length encoder 406, a non-AC prediction mode variable length encoder 407, and a coding arbitrator 410. The coding arbitrator 410 further comprises a mode selector 412 and an output selector 414. It will be apparent to one of the ordinary skill in the art that the memory blocks 404 and 405 may be in the same memory or in a different memories.

Wherein, the discrete cosine transforming unit 400 performs a discrete cosine transform process on the block B in order to transform the block B from a spatial domain to a frequency domain, such that a cosine transformed block CB is obtained and provided to the quantizer 402. The quantizer 402 receives and quantizes the cosine transformed block CB, such that the high-frequency coefficient therein is reduced to 0 as much as possible and a quantized block QCB is provided. The AC prediction mode variable length encoder 406 and the non-AC prediction mode variable length encoder 408 simultaneously receive the quantized block QCB. Wherein, the AC prediction mode variable length encoder 406 performs an AC prediction and a variable length coding (VLC) on the quantized block QCB for obtaining a bit string BS1, and the bit string BS1 is then stored in the memory block 405. The non-AC prediction mode variable length encoder 408 performs a variable length coding (VLC) directly on the quantized block QCB for obtaining a bit string BS2, and the bit string BS2 is then stored in the memory block 404.

The coding arbitrator 410 compares the bit strings BS1 and BS2 stored in the memory for determining which bit string has fewer number of bits, and the bit string with fewer number of bits is output as an encoded bit string Encoded-BS. The functions of selecting and outputting the bit string with fewer number of bits mentioned above are implemented by the internal mode selector 412 and the output selector 414. Wherein, the mode selector 412 compares the bit numbers generated by two encoder in real time. If none of the memory blocks 404 and 405 reaches its capacity limit (meanwhile, the coding may or may not be fully completed) and the bit string BS1 has fewer number of bits, a signal S1 is generated. The capacity limit of the memory block means that no more bits can be stored in the memory block if the capacity limit is reached. Whereas, if none of the memory blocks 404 and 405 reaches its capacity limit and the bit string BS2 has fewer number of bits, a signal S2 is generated. Moreover, if the bit number of the bit string BS1 reaches the capacity limit of the memory block 404, the signal S2 is generated. Whereas, if the bit number of the bit string BS2 reaches the capacity limit of the memory block 405, the signal S1 is generated. In addition, if both the memory blocks 404 and 405 reach the capacity limit, the signal S2 is generated. Furthermore, the output selector 414 outputs the bit string BS1 as the encoded bit string Encoded-BS if the signal S1 is received. Whereas, the output selector 414 outputs the bit string BS2 as the encoded bit string Encoded-BS if the signal S2 is received.

It will be apparent to one of the ordinary skill in the art that a smaller memory is used in the present invention. Since whether to use the AC predication mode for encoding or not is determined by the apparatus provided by the present invention before the coding is fully completed. Compared with the conventional technology in FIG. 3, the present invention requires a smaller memory, such that the object of saving memory space is achieved.

Figure 5:
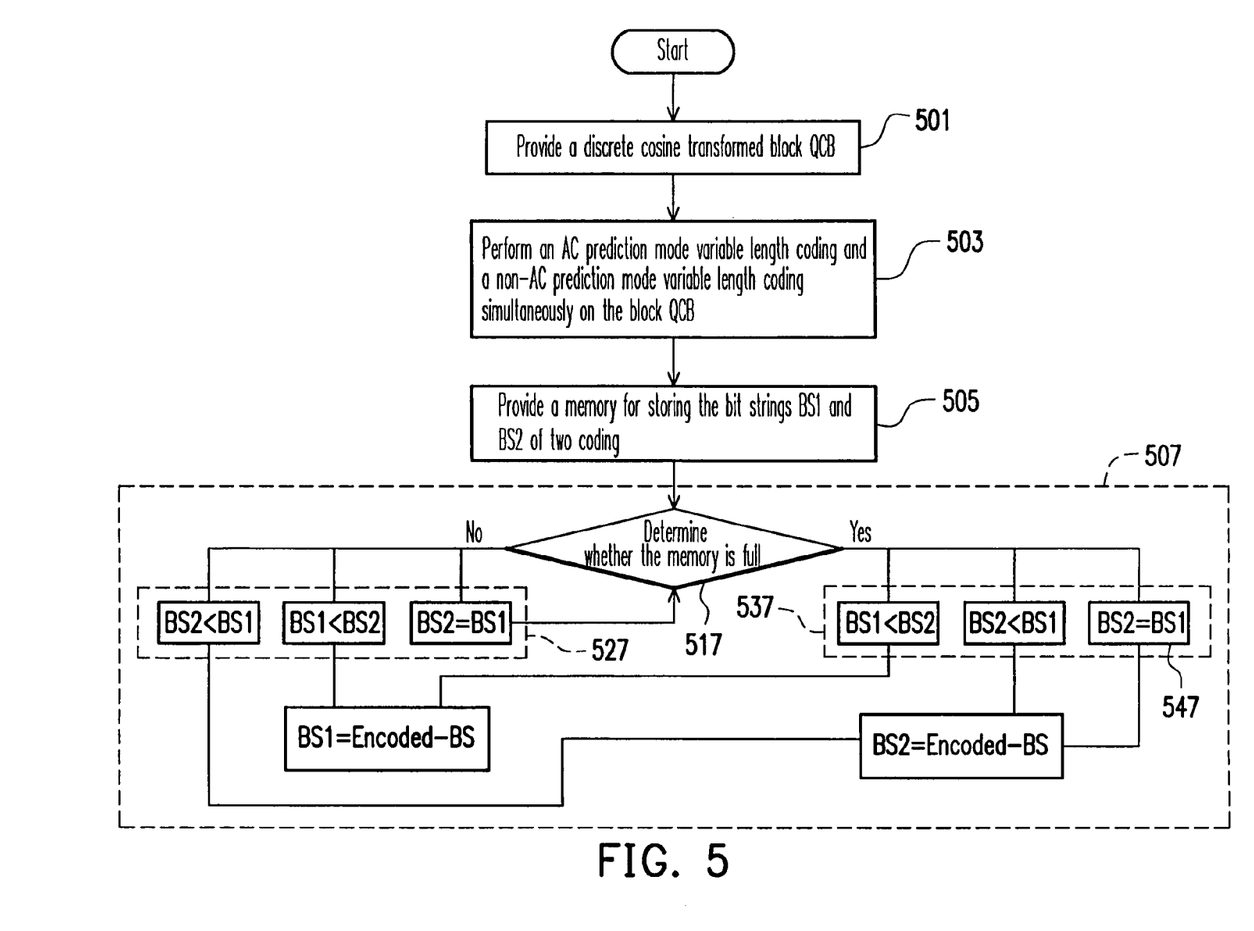
FIG. 5 schematically shows a flow chart illustrating a method for discrete cosine transform coefficient prediction according to an embodiment of the present invention.

FIG. 5 schematically shows a flow chart illustrating a method for discrete cosine transform coefficient prediction according to an embodiment of the present invention. The embodiment of the apparatus provided by the present invention comprises the following steps. Referring to FIG. 4 and FIG. 5, first, a discrete cosine transformed block QCB is provided (step 501). Then, an AC prediction mode variable length coding and a non-AC prediction mode variable length coding are simultaneously performed on the block QCB (step 503). Then, a memory block 404 and a memory block 405 are provided for storing the bit strings BS1 and BS2 of two coding (step 505). Before the coding process is fully completed, the bit numbers of the bit strings BS1 and BS2 in the memory blocks 404 and 405 of two coding are compared with each other, so as to determine which bit string should be used as the encoded bit string Encoded-BS (step 507).

Wherein, step 507 further comprises the following substeps. First, it is determined whether the memory is full (step 517). If the memory is not full, both of the bit numbers generated by coding are compared in real time and it is determined to use an encoded bit string Encoded-BS with fewer number of bits (i.e. if BS1<BS2, then BS1 is selected, whereas if BS2<BS1, then BS2 is selected) (step 527). If the memory is full, an encoded bit string Encoded-BS bit with fewer number of bits is selected (i.e. if BS1<BS2, then BS1 is selected, whereas if BS2<BS1, then BS2 is selected) (step 537). If the bit numbers of both coding BS1 and BS2 are the same, the AC prediction mode variable length coding is used to encode the BS2, and then the encoded BS2 is used as the encoded bit string Encoded-BS (step 547).

Figure 6:
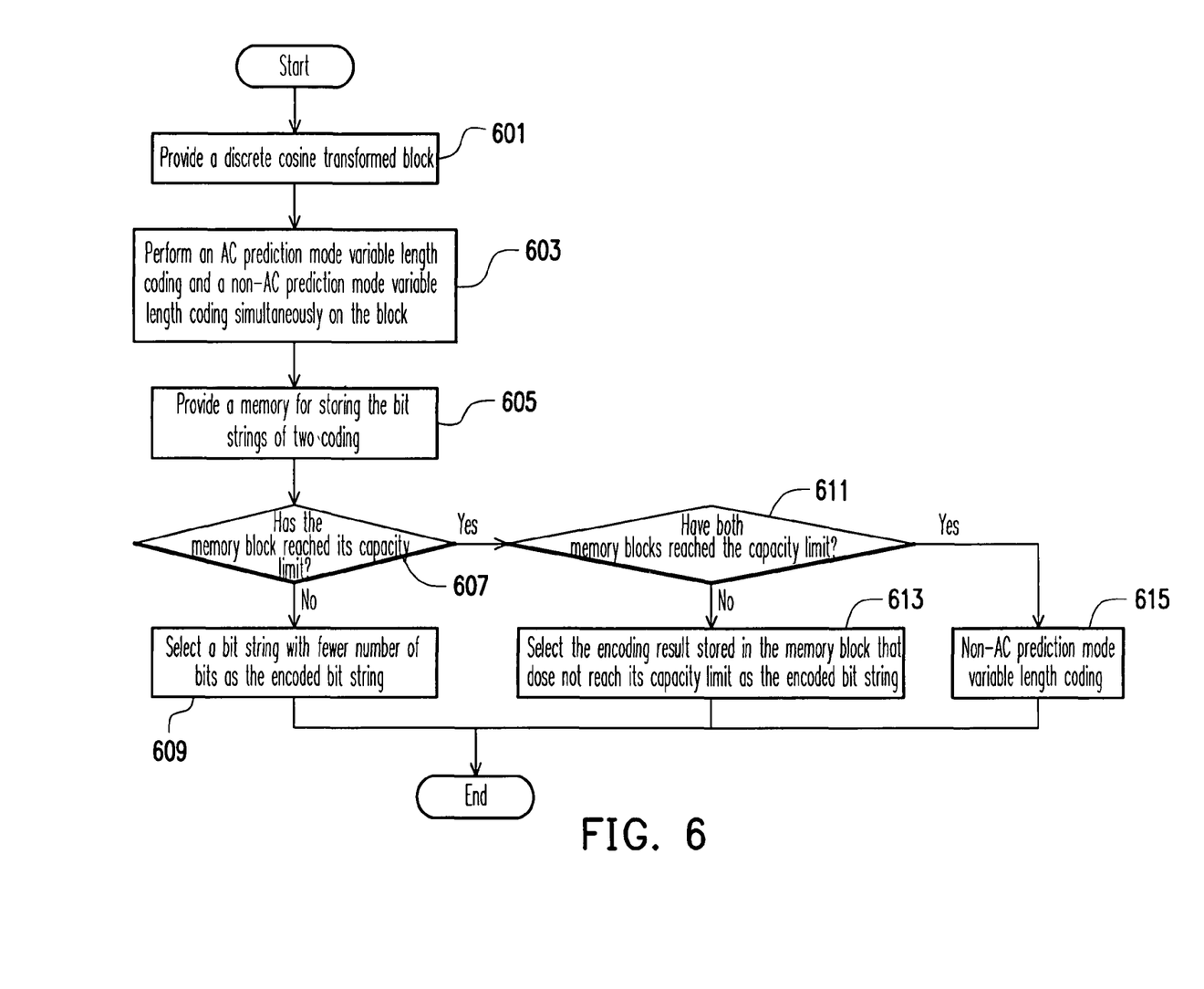
FIG. 6 schematically shows a flow chart illustrating a method for discrete cosine transform coefficient prediction according to another embodiment of the present invention.

FIG. 6 schematically shows a flow chart illustrating a method for discrete cosine transform coefficient prediction according to another embodiment of the present invention. The embodiment of FIG. 4 comprises the following steps. Referring to FIG. 6, first, a discrete cosine transformed block QCB is provided (step 601). Then, an AC prediction mode variable length coding and a non-AC prediction mode variable length coding are simultaneously performed on the block QCB (step 603). Then, a memory block 404 and a memory block 405 are provided for storing the bit strings BS1 and BS2 of two coding (step 605). Then, it is determined whether one of the memory blocks reaches its capacity limit (step 607). If the result is no, the bit string BS1 or BS2 with fewer number of bits is selected as the encoded bit string Encoded-BS (step 609). If the result is yes, the process goes to the next step to further determine whether both memory blocks 404 and 405 reach the capacity limit (step 611). If the result is no, the encoding result stored in the memory block that dose not reach its capacity limit is selected as the encoded bit string Encoded-BS (step 613). If the result is yes, the non-AC prediction mode variable length coding is selected as the encoded bit string Encoded-BS (step 615).

In summary, in the present invention, the bit numbers generated by two coding are compared in real time, thus it is possible to determine which coding should be used before the coding is fully completed. Accordingly, the present invention can speed up the process of determining the coding mode and save the memory space.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An apparatus for discrete cosine transform coefficient prediction, wherein a first memory block and a second memory block are used and a discrete cosine transformed block is input into the apparatus for encoding the block into an encoded bit string; the apparatus comprising: an AC prediction mode variable length encoder for receiving the block, performing an AC prediction and a first variable length coding on the block, and saving a first encoded bit string in the first memory block; a non-AC prediction mode variable length encoder for receiving the block, performing a second variable length coding on the block, and saving a second encoded bit string in the second memory block; and a coding arbitrator, comprising: a mode selector for comparing the first bit string and the second bit string, wherein the mode selector provides a first signal when the first bit string has fewer number of bits or a bit number of the second bit string reaches a second capacity limit of the second memory block, provides a second signal when the second bit string has fewer number of bits, a bit number of the first bit string reaches a first capacity limit of the first memory block or both of the first and the second memory blocks respectively reach the first and second capacity limits; and an output selector, wherein the output selector provides the first bit string as the encoded bit string when receiving the first signal, and provides the second bit string as the encoded bit string when receiving the second signal.

2. A method for discrete cosine transform coefficient prediction, comprising: providing a discrete cosine transformed block; performing an AC prediction mode variable length coding and a non-AC prediction mode variable length coding simultaneously on the block; providing a first memory block and a second memory block for storing the bit strings of the AC prediction mode variable length coding and the non-AC prediction mode variable length coding; and selecting one of the AC prediction mode variable length coding and the non-AC prediction mode variable length coding for the discrete cosine transform coefficient prediction by comparing the bit numbers generated by the AC prediction mode variable length coding and the non-AC prediction mode variable length coding and using a coding with fewer number of bits stored if both the first and the second memory blocks do not reach a first and a second capacity limits respectively, or using a coding when either one of the first and the second memory blocks reach a first capacity limit and a second capacity limit respectively, wherein using the non-AC prediction mode variable length coding if the memory reaches the second capacity limit and the bit numbers of both the AC prediction mode variable length coding and the non-AC prediction mode variable length coding are the same.

* * * * *